(12) United States Patent
Wu et al.

(10) Patent No.: US 10,452,825 B2
(45) Date of Patent: Oct. 22, 2019

(54) USER IDENTITY AUTHENTICATION USING VIRTUAL REALITY

(71) Applicant: Alibaba Group Holding Limited, George Town (KY)

(72) Inventors: Jun Wu, Hangzhou (CN); Xiaodong Zeng, Hangzhou (CN); Huanmi Yin, Hangzhou (CN); Feng Lin, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 15/782,672

(22) Filed: Oct. 12, 2017

(65) Prior Publication Data

US 2018/0107814 A1 Apr. 19, 2018

(30) Foreign Application Priority Data

Oct. 13, 2016 (CN) .......................... 2016 1 0895470

(51) Int. Cl.
*G06F 21/32* (2013.01)
*G02B 27/01* (2006.01)
(Continued)

(52) U.S. Cl.
CPC ........... *G06F 21/32* (2013.01); *G02B 27/017* (2013.01); *G06F 3/011* (2013.01); *G06F 3/013* (2013.01); *G06F 21/31* (2013.01); *G06F 21/62* (2013.01)

(58) Field of Classification Search
CPC .......... G06F 21/32; G06F 3/011; G06F 3/013; G06F 21/31; G06F 21/62; G02B 27/017
(Continued)

(56) References Cited

U.S. PATENT DOCUMENTS 9,054,819 B2 6/2015 Abdeljaoued
9,092,600 B2 7/2015 Scavezze et al.
(Continued)

FOREIGN PATENT DOCUMENTS

CN 104580143 4/2015
CN 105867637 8/2016
(Continued)

OTHER PUBLICATIONS

International Search Report and Written Opinion of the International Searching Authority issued in International Application No. PCT/US2017/056609 dated Jan. 5, 2018; 8 pages.
(Continued)

*Primary Examiner* — Michael Pyzocha
*Assistant Examiner* — Zoha Piyadehghibi Tafaghodi
(74) *Attorney, Agent, or Firm* — Fish & Richardson P.C.

(57) ABSTRACT

A method for user identity authentication using virtual reality includes presenting one or more virtual elements on a virtual reality (VR) scenario of a VR application for initiating a service, identifying, using one or more sensors communicably coupled to the VR device, one or more interactive operations of a user of the VR device with the one or more virtual elements, determining whether the one or more interactive operations match one or more predetermined operations for selecting the one or more virtual elements to initiate the service and trigger biometric authentication for user identity authentication, invoking biometric authentication if the one or more interactive operations match one or more predetermined operations, presenting a virtual guidance in the VR scenario for guiding the user to perform the biometric authentication, and presenting a service interface to the user if the biometric authentication is successful.

20 Claims, 2 Drawing Sheets (51) Int. Cl.
*G06F 3/01* (2006.01)
*G06F 21/31* (2013.01)
*G06F 21/62* (2013.01)

(58) Field of Classification Search
USPC ........................................................ 713/186
See application file for complete search history.

(56) References Cited

U.S. PATENT DOCUMENTS

| | | |
|---|---|---|
| 2009/0159786 A1* | 6/2009 | Yang ..................... G06F 3/0412 250/227.29 |
| 2009/0235086 A1 | 9/2009 | Lai et al. |
| 2012/0167124 A1 | 6/2012 | Abdeljaoued |
| 2014/0125574 A1 | 5/2014 | Scavezze et al. |
| 2015/0062003 A1 | 3/2015 | Rafii et al. |
| 2015/0324562 A1 | 11/2015 | Scavezze et al. |
| 2016/0342782 A1 | 11/2016 | Mullins et al. |
| 2017/0285731 A1* | 10/2017 | Kwak ..................... G06F 3/011 |
| 2017/0364920 A1* | 12/2017 | Anand ................ H04L 63/0861 |

FOREIGN PATENT DOCUMENTS

| | | |
|---|---|---|
| CN | 105930816 | 9/2016 |
| CN | 105955491 | 9/2016 |

OTHER PUBLICATIONS

International Preliminary Report on Patentability in International Application No. PCT/US2017/056609, dated Feb. 11, 2019, 11 pages.
European Extended Search Report in European Patent Application No. 17860466.6, dated Jul. 18, 2019, 9 pages.

* cited by examiner

FIG. 1

FIG. 2 ized images, sounds, and other sensations that simulate a user's physical presence in a three dimensional (3D) virtual environment and allow the VR user to interact with the virtual environment. -->

USER IDENTITY AUTHENTICATION USING VIRTUAL REALITY

This application claims priority to Chinese Patent Application No. 201610895470.8, filed on Oct. 13, 2016, the entire contents of which is hereby incorporated by reference.

TECHNICAL FIELD

This disclosure relates to user identity authentication, and more particularly to user biometric authentication based on virtual reality.

BACKGROUND

Virtual reality (VR) is a computer technology that uses VR devices, such as headsets, sometimes in combination with physical spaces or multi-projected environments, to generate realistic images, sounds, and other sensations that simulate a user's physical presence in a three dimensional (3D) virtual environment and allow the VR user to interact with the virtual environment. Many applications, such as those for gaming, content consumption, and productivity, have been developed to provide user an immersive experience using VR technology. Many VR applications allow in-application purchases, user customization, or parental control. These operations should require user identity authentication for security purposes.

SUMMARY

The present disclosure describes methods and systems, including computer-implemented methods, computer program products, and computer systems for biometric user identity authentication based on virtual reality (VR).

In an implementation, one or more virtual elements are presented on a VR scenario of a VR application for initiating a service. One or more interactive operations of a user of the VR device with the one or more virtual elements are identified using one or more sensors communicably coupled to the VR device. Whether the one or more interactive operations match one or more predetermined operations for selecting the one or more virtual elements to initiate the service and trigger biometric authentication for user identity authentication is determined. Biometric authentication is invoked if the one or more interactive operations match one or more predetermined operations. A virtual guidance is presented in the VR scenario for guiding the user to perform the biometric authentication, and a service interface is presented to the user if the biometric authentication is successful.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize performing biometric user identity authentications in a virtual environment and provide faster, more convenient operations, and more immersive experience to VR users. Other advantages will be apparent to those of ordinary skill in the art.

The details of one or more implementations of the subject matter of this specification are set forth in the Detailed Description, the claims, and the accompanying drawings. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes technologies related to using biometric authentication to verify user identity based on virtual reality (VR), and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Virtual reality (VR) is a computer technology that uses VR devices, such as headsets, sometimes in combination with physical spaces or multi-projected environments, to generate realistic images, sounds, and other sensations that simulate a user's physical presence in a three dimensional (3D) virtual environment and allow the VR user to interact with the virtual environment. Many applications, such as those for gaming, content consumption, and productivity, have been developed to provide user an immersive experience using VR technology. Many VR applications allow in-application purchases, user customization, or parental control. These operations should require user identity authentication for security purposes. In some cases, the authentication process can be insecure or the VR user may need to use complicated gestures or exit from the virtual environment to perform an identity authentication.

The present disclosure describes technologies for faster and more convenient user identity authentication based on biometric recognition using a VR device, on a target service executed by a user in a VR scenario, and requiring security authentication. When a user uses a VR device to perform a service, the VR device may identify user interaction operations with virtual elements rendered in the VR scenario using one or more sensors. When it is identified that the user interaction operations match one or more pre-stored operations, the VR device may invoke biometric recognition to collect a biometric characteristic of the user and to initiate biometric authentication for the service provided by a service server. If the biometric authentication is successful, the user may perform a service interaction to complete the service. As such, the user may use biometric recognition to quickly perform user identity authentication in the VR environment, to simplify the user identity authentication procedure and ensure account security. For example, using a payment service in a VR environment, biometric authentication through the VR device can permit faster user identity authentication, when compared to entering a password through complicated user interactions with a virtual keyboard.

Figure 1:
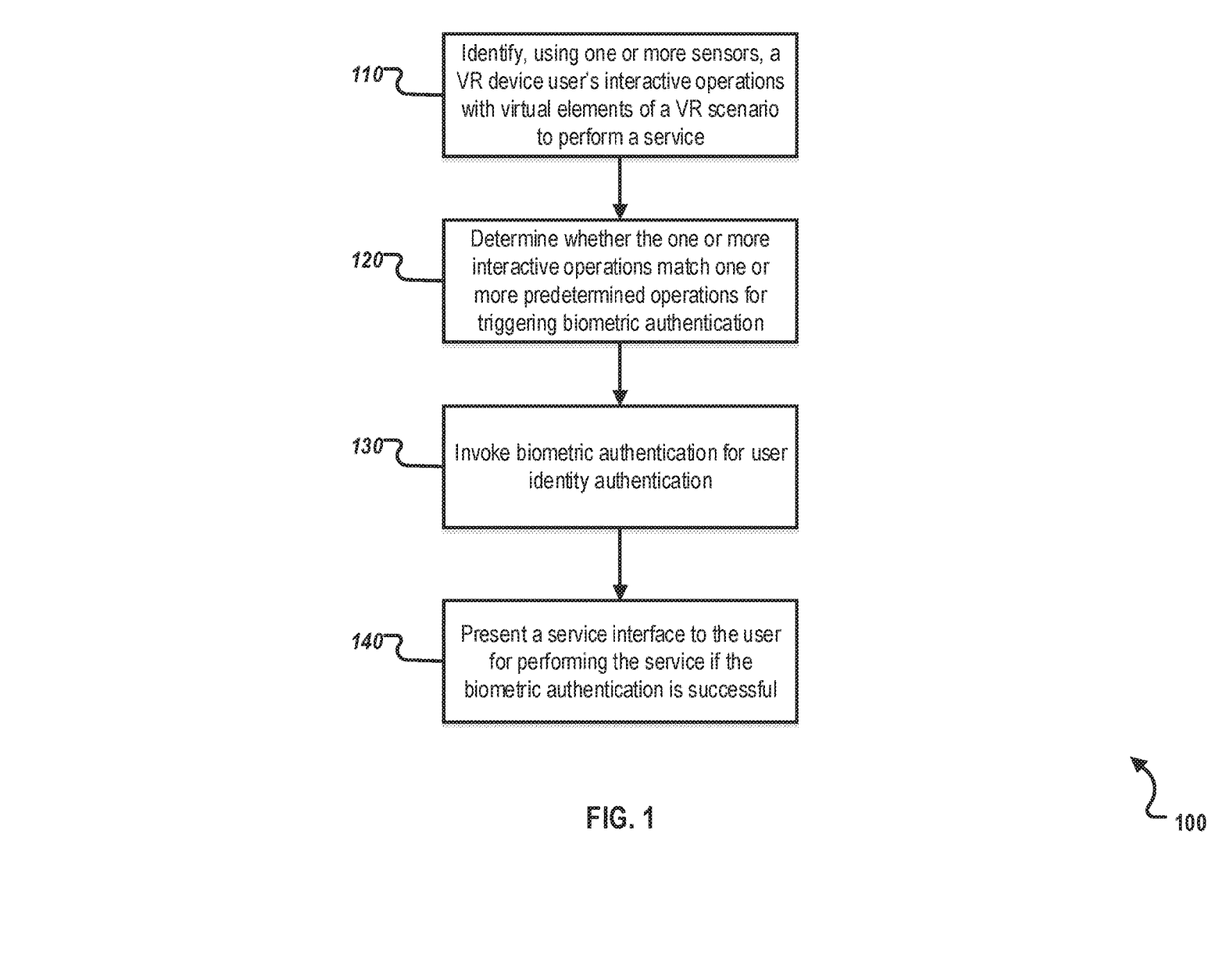
FIG. 1 is a flowchart illustrating an example method for biometric user identity authentication based on virtual reality, according to an implementation of the present disclosure.

FIG. 1 is a flowchart illustrating an example method 100 for biometric user identity authentication based on VR, according to an implementation of the present disclosure. For clarity of presentation, the description that follows generally describes method 100 in the context of the other figures in this description. However, it will be understood that method 100 may be performed, for example, by any suitable system, environment, software, and hardware, or a combination of systems, environments, software, and hardware, as appropriate. In some cases, various steps of method 100 can be run in parallel, in combination, in loops, or in any order. Example method 100 can be performed by VR software or an application.

At 110, using one or more sensors, a VR device user's interactive operations with virtual elements of a VR scenario to perform a service are identified. In some implementations, the sensors can include an infrared sensor, an image sensor, a laser sensor, a radar sensor, or any other sensors that can detect user characteristics, gestures, or interactions in the VR environment. The service can be any service, application, or task performed by the user in the VR environment that requires user identity authentication. For example, the service can be a payment service, such as payment made in VR shopping, VR games, VR-based video-on-demand, or donation to a VR livecast. The virtual element can be a virtual button or pattern generated in a VR scenario to be used by the user to interact with the VR application, such as triggering a biometric authentication. Using again the payment service for example, the virtual element can be a virtual payment button. The user can select the payment button by using a particular gesture or movement (for example, with the head, hand, or body) to initiate the payment service. In some implementations, a gesture can include a 3D gesture performed with a hand.

The VR scenario or VR environment can be created by VR modeling using a modeling tool, such as UNITY, 3DSMAX, or PHOTOSHOP. In some cases, the VR modeling and VR scenario texture mapping can be based on real-life scenarios. For example, texture maps of materials and real-life scenario models can first be collected by photographing real life objects or scenarios. Modeling tools such as PHOTOSHOP or 3DMAX can then be used for texture processing and real-life 3D model creation. The 3D model can then be imported to a UNITY3D (U3D) PLATFORMER and multi-dimensionally rendered through sound effects, graphical interfaces, plug-ins, and lighting. Interaction code can then be executed to convert the 3D model to a VR scenario model.

In some cases, a two-dimensional (2D) or 3D service interface can be created in the VR scenario for performing the service using the 3D modeling tool. For example, the service interface for a payment service can be a virtual checkout counter. The user can interact with the virtual checkout counter using specific interaction operations (for example, a predetermined head posture or a gesture) to make a payment in the VR scenario. From 110, method 100 proceeds to 120.

At 120, whether the one or more interactive operations match one or more predetermined operations for triggering biometric authentication is determined. After the VR scenario modeling and service interface modeling, the VR device can present the VR scenario and the service interface to the user. In some cases, the VR scenario model and a virtual element for triggering the service interface can be presented to the user. When a user needs to perform the service while engaged in the immersive experience provided by the VR scenario, the user can interact with the virtual element to trigger the service interface.

The user can interact with the virtual element through any movements or gestures. For example, the user can move the head to control the movement of a visual focus, which can be used as an operational focus (for example, a cursor) in the VR scenario. For example, the VR device can use a sensor to track the movement of the head, and use the sensed movement to change the operational focus location in the VR scenario. When the user moves their head to move the operational focus to a virtual element and stay focused on the virtual element for a predetermined amount of time (for example, three seconds), the VR device can determine that the virtual element is selected and trigger the service interface in the VR scenario.

As another example, the user can position the operational focus on the virtual element by moving the hand, and then use a predetermined 3D gesture to select the virtual element. The VR device can use a sensor to track the user's hand movement, calculate depth information of the user's hand with respect to the VR scenario based on the user's hand displacement sensed by the sensor, and then replicate a 3D gesture made by the user in the VR scenario. If the 3D gesture is the same as one of the pre-stored gestures, the VR device can select the virtual element and trigger the service interface in the VR scenario. After 120, method 100 proceeds to 130.

At 130, biometric authentication for user identity authentication is invoked. In some cases, the VR device can include a biometric recognition function to facilitate user identity authentication. The biometric recognition function can be performed by a biometric sensor that can identify one or more biometric characteristics of the user, such as a fingerprint, iris, or sclera. The biometric sensor can be built-in to the VR device, separate from, but communicably coupled to, the VR device, or integrated on a mobile device, such as a smartphone.

In some cases, the VR device can be a slide-in type VR headset, which can function by inserting or sliding in a smartphone to the headset, and converting the images displayed on the smartphone to VR scenarios. In such cases, the VR device can rely on built-in biometric sensors such as a fingerprint sensor, camera, or microphone to perform fingerprint, iris, or voice recognition.

Using fingerprint authentication for example, the user can first register a fingerprint using a fingerprint sensor, and associate a user service account on a server with the fingerprint information. For example, when the service is a VR payment service, the service account of the user can be a payment account. The user's payment account can be associated with the user's fingerprint information after fingerprint registration. After fingerprint registration, the user can use fingerprint authentication to perform user identity authentication for the service instead of entering a password (for example, an alphanumeric string of characters).

In some cases, the user can log-in to the user account to use the VR device and perform fingerprint authentication prompted in a service interface to access the service in a VR scenario. The VR device can send the fingerprint information and VR device user account log-in information as a registration message to a service server. The service server can use the received information to associate the user's fingerprint information to a service account and save the fingerprint information to a service account mapped to a biometric characteristics database. In some cases, the user account can be the same as the service account.

In some cases, the VR device can perform additional security authentication before sending the registration message to the service server for enhanced security. For example, the VR device can prompt the user to input a password or other security information to verify the user's identity before sending the user's fingerprint registration message to the service server. This process can prevent unauthorized users from fraudulently registering fingerprint information to map to the authorized user's user account. After fingerprint registration, the VR device can initiate biometric authentication based on the user's fingerprint when the user selects a virtual element to trigger the service. For fingerprint authentication, the fingerprint can be collected by a fingerprint sensor.

In some cases, the VR device can perform a bioassay process before collecting biometric information to ensure that the VR device is currently being used by a real person. This process can prevent unauthorized users from using fingerprint or iris images of the authorized user for biometrical authentication and illegally accessing the authorized user's service account. Example bioassay processes can include eye-blinking or heartbeat recognition.

After a real user is detected using the bioassay process, the VR device can prompt the user to perform biometric authentication for accessing the service account. Using a VR payment service for an example, the VR device can present a text prompt in the VR scenario such as "Please scan your fingerprint for payment authentication." In some cases, it can be difficult for the user to perform fingerprint scanning while in the virtual environment and wearing the VR device. The VR device can prompt one or more virtual elements to indicate a mounting position of the fingerprint sensor on the VR device. The one or more virtual elements can guide the user to scan the fingerprint sensor for fingerprint recognition (for example, on the right side of a VR headset).

In some cases, the VR device can output a static mark or arrow in the user view of the VR scenario, to indicate a relative position of the fingerprint sensor on the VR device. For example, if the fingerprint sensor is mounted on the upper right, front corner of a VR headset, a virtual flickering arrow can be shown in the VR scenario to point to the relative position of the fingerprint sensor. As such, the user can be guided to move the finger towards the upper right corner of her view, to scan the finger for fingerprint recognition.

In some cases, the VR device can output a dynamic mark or arrow in the user view of the VR scenario to guide the user to move the finger to the fingerprint sensor. For example, the dynamic mark can start by pointing to a general direction of the fingerprint sensor location. Other motion sensors can be used to sense the movement of the user's finger or hand by the VR device to dynamically adjust the pointing direction of the mark until the user successfully scans the finger on the fingerprint sensor. Or, the VR device can show a dynamic trajectory of the user's hand or finger movement and the relative location of the fingerprint sensor on the VR scenario, so the user can be aware of the relative position between the finger and the fingerprint sensor.

As such, the user who wears the VR device to experience the virtual environment may not need to remove the VR device to perform biometric authentication. This can help facilitate the user identity authentication process and reduce interruption of the user's immersive VR experience.

In some cases, after biometric information is collected by the VR device, the VR device can generate a biometric recognition request to the service server. The biometric recognition request can include the user's user or service account information and biometric information. The service server can provide a biometric recognition interface to the VR device for receiving the request and submitting the request to the server. In some cases, the services server can cooperate with a biometric recognition server and the biometric recognition interface can be provided by the biometric recognition server.

After receiving the biometric recognition request, the service server can parse the request, acquire the biometric information and the user account information, and compare the biometric information with biometric sample data stored in the biometric characteristic database. In some cases, if a match between the biometric information and a biometric sample data is found, the service server can further verify whether the received user account information matches the account associated with the matching biometric sample data. After comparing the biometric information and user account information with the corresponding information stored in the biometric characteristic database, the service server can return an authentication result to the VR device. In some implementations, the authentication result can be returned as a Boolean-type return value (that is, true or false). If one or both the biometric information and user account information match the corresponding information stored in the biometric characteristic database, a "true" value can be returned to indicate that the biometric authentication succeed. Otherwise, a "false" value can be returned to indicate that the biometric authentication failed.

In some cases, the VR device can perform biometric authentication locally. The user's biometric information can be saved in the VR device during biometric information registration (for example, registering fingerprint information to the user account on the VR device). After the user triggers the service in the VR scenario, the VR device can collect the biometric information of the user, and compare the biometric information with the biometric information saved during biometric information registration. If the biometric information matches the saved information, the biometric authentication for the service succeeds. Otherwise, the biometric authentication fails. After 130, method 100 proceeds to 140.

At 140, if the biometric authentication is successful, a service interface is presented to the user for performing the service. If the biometric authentication is successful (for example, a returned value is "true"), the VR device can present the service interface corresponding to the service to gather data related to the service, establish a service request, submit the service request to the service server through a service access interface, and perform further interactions with the service server, if needed, to perform the service.

Using a VR payment service as an example, the VR device can present a payment interface to gather payment related data, such as user name, order information, and price, generate a payment processing request, and send the payment processing request to the service server. The service server can process the request and complete the payment.

The following example uses VR shopping to illustrate how biometric authentication can provide a safer, faster, and simpler service experience to the user. It is assumed that the biometric information used is the fingerprint. The service for the VR shopping can be a payment service such as ALIPAY. The virtual element can be a virtual button presented in the VR shopping scenario. The server for the payment service can be a payment server such as the ALIPAY platform based on a server cluster.

The user logs into the VR device using the user's user account or payment account and completes fingerprint registration on the VR device to associate their fingerprint to the payment account. The user's account information and corresponding fingerprint information can be stored in a biometric characteristic database on a payment server. After fingerprint registration, the user can use a finger for biometric authentication in a VR environment.

When wearing the VR device for VR shopping, the items for sale can be presented to the user in the VR scenario and the user can navigate through the item list, select items, or add items to shopping cart using gestures or movements. In some cases, a virtual button (that is, a virtual element) for checkout or payment can be provided when an item is selected or added to the user's shopping cart. The user can use gestures or movements to move an operational focus (for example, a cursor) to the virtual button and use a predetermined gesture(s) or movement(s) to select the virtual button.

The payment service can be initiated after the virtual button is selected and user identity authentication can also be triggered. In some cases, The VR device can perform a bioassay process to determine whether a real user of the VR device is present. If so, the VR device can generate a message prompt in the VR scenario, such as "Please scan your fingerprint for payment authentication".

Assuming that the fingerprint sensor is mounted on the upper right corner of the VR device, a virtual flickering arrow or a dynamic pointer pointing to the upper right corner can be presented in the VR scenario to guide the user in moving a finger to the fingerprint sensor for fingerprint collection.

After fingerprint collection, the VR device can send a fingerprint authentication request including the collected fingerprint information and the user's user account or payment account information to the payment server. The payment server can compare the fingerprint information with the fingerprint information stored in the biometric characteristic database during fingerprint registration. If the received fingerprint information matches the fingerprint associated with the user account stored in the database, and the payment account information is consistent with the stored user account information, the payment server can return a Boolean-type "true" value to the VR device to indicate that the fingerprint authentication is successful.

After having acknowledged that the payment was successful, the VR device can present a payment interface for the user to input payment data, such as user name, order information, and payment amount related to the payment service, generate and send a payment processing request to the payment server. The payment server can process the payment and complete the purchase.

In some cases, an "authentication-free for small amount" payment process can be used to further facilitate payment speed. For example, when the user triggers the payment service by selecting the virtual button for payment, the VR device can check the price of the items and determine whether the payment amount is less than a preset amount (for example, 20 USD). If the payment amount is less than the preset amount, the VR device can directly generate and send the payment processing request to the payment server without biometric authentication. Otherwise, the user is required to perform biometric authentication before the payment service can be used.

Figure 2:
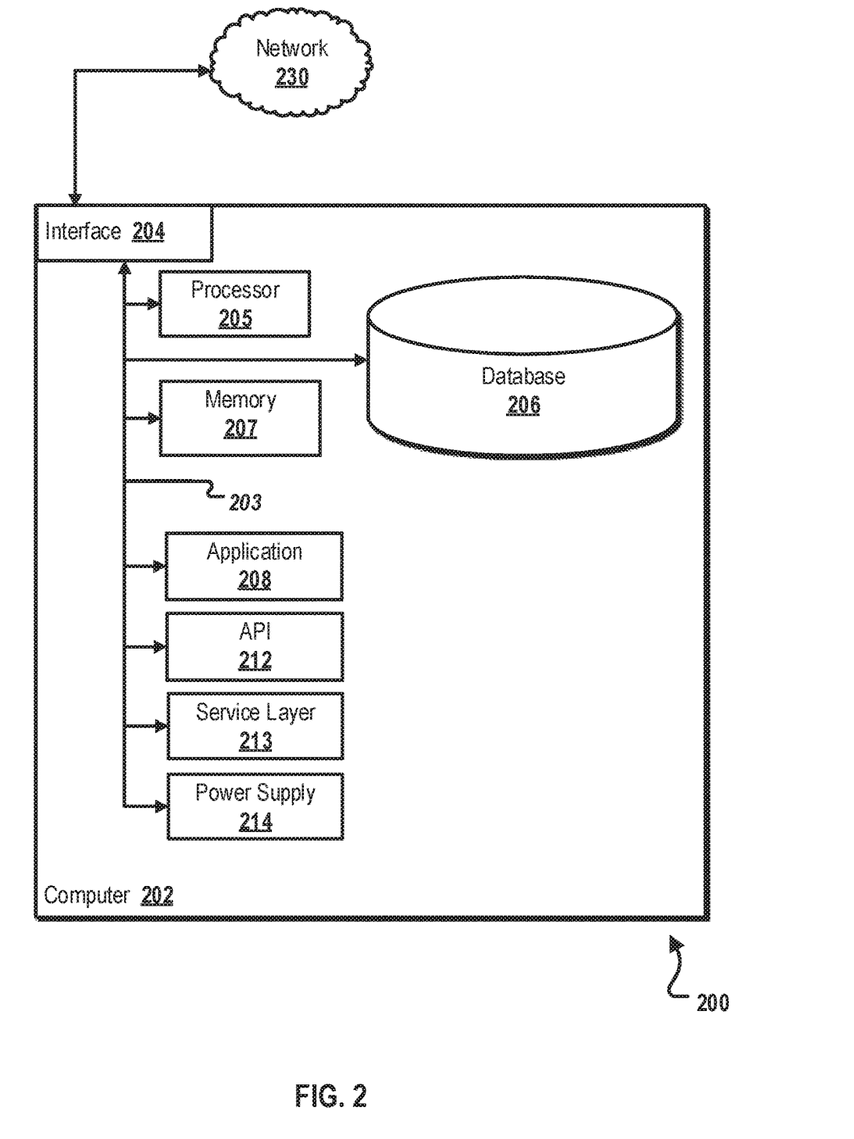
FIG. 2 is a block diagram illustrating an example computer system used to provide computational functionalities associated with described algorithms, methods, functions, processes, flows, and procedures as described in the instant disclosure, according to an implementation of the present disclosure.

FIG. 2 is a block diagram illustrating an example of a computer system 200 used to provide computational functionalities associated with described algorithms, methods, functions, processes, flows, and procedures, according to an implementation of the present disclosure. The illustrated computer 202 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 202 can comprise a computer that includes an input device, such as a keypad, keyboard, touch screen, another input device, or a combination of input devices that can accept user information, and an output device that conveys information associated with the operation of the computer 202, including digital data, visual, audio, another type of information, or a combination of types of information, on a graphical-type UI (or GUI) or other UI.

The computer 202 can serve in a role in a computer system as a client, network component, a server, a database or another persistency, another role, or a combination of roles for performing the subject matter described in the present disclosure. The illustrated computer 202 is communicably coupled with a network 230. In some implementations, one or more components of the computer 202 can be configured to operate within an environment, including cloud-computing-based, local, global, another environment, or a combination of environments.

At a high level, the computer 202 is an electronic computing device operable to receive, transmit, process, store, or manage data and information associated with the described subject matter. According to some implementations, the computer 202 can also include or be communicably coupled with a server, including an application server, e-mail server, web server, caching server, streaming data server, another server, or a combination of servers.

The computer 202 can receive requests over network 230 (for example, from a client software application executing on another computer 202) and respond to the received requests by processing the received requests using a software application or a combination of software applications. In addition, requests can also be sent to the computer 202 from internal users (for example, from a command console or by another internal access method), external or third-parties, or other entities, individuals, systems, or computers.

Each of the components of the computer 202 can communicate using a system bus 203. In some implementations, any or all of the components of the computer 202, including hardware, software, or a combination of hardware and software, can interface over the system bus 203 using an application programming interface (API) 212, a service layer 213, or a combination of the API 212 and service layer 213. The API 212 can include specifications for routines, data structures, and object classes. The API 212 can be either computer-language independent or dependent and refer to a complete interface, a single function, or even a set of APIs.

The service layer 213 provides software services to the computer 202 or other components (whether illustrated or not) that are communicably coupled to the computer 202. The functionality of the computer 202 can be accessible for all service consumers using this service layer. Software services, such as those provided by the service layer 213, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 202, alternative implementations can illustrate the API 212 or the service layer 213 as stand-alone components in relation to other components of the computer 202 or other components (whether illustrated or not) that are communicably coupled to the computer 202. Moreover, any or all parts of the API 212 or the service layer 213 can be implemented as a child or a sub-module of another software module, enterprise application, or hardware module without departing from the scope of the present disclosure.

The computer 202 includes an interface 204. Although illustrated as a single interface 204 in FIG. 2, two or more interfaces 204 can be used according to particular needs, desires, or particular implementations of the computer 202. The interface 204 is used by the computer 202 for communicating with another computing system (whether illustrated or not) that is communicatively linked to the network 230 in a distributed environment. Generally, the interface 204 is operable to communicate with the network 230 and comprises logic encoded in software, hardware, or a combination of software and hardware. More specifically, the interface 204 can comprise software supporting one or more communication protocols associated with communications such that the network 230 or interface's hardware is operable to communicate physical signals within and outside of the illustrated computer 202.

The computer 202 includes a processor 205. Although illustrated as a single processor 205 in FIG. 2, two or more processors can be used according to particular needs, desires, or particular implementations of the computer 202. Generally, the processor 205 executes instructions and manipulates data to perform the operations of the computer 202 and any algorithms, methods, functions, processes, flows, and procedures as described in the present disclosure.

The computer 202 also includes a database 206 that can hold data for the computer 202, another component communicatively linked to the network 230 (whether illustrated or not), or a combination of the computer 202 and another component. For example, database 206 can be an in-memory, conventional, or another type of database storing data consistent with the present disclosure. In some implementations, database 206 can be a combination of two or more different database types (for example, a hybrid in-memory and conventional database) according to particular needs, desires, or particular implementations of the computer 202 and the described functionality. Although illustrated as a single database 206 in FIG. 2, two or more databases of similar or differing types can be used according to particular needs, desires, or particular implementations of the computer 202 and the described functionality. While database 206 is illustrated as an integral component of the computer 202, in alternative implementations, database 206 can be external to the computer 202.

The computer 202 also includes a memory 207 that can hold data for the computer 202, another component or components communicatively linked to the network 230 (whether illustrated or not), or a combination of the computer 202 and another component. Memory 207 can store any data consistent with the present disclosure. In some implementations, memory 207 can be a combination of two or more different types of memory (for example, a combination of semiconductor and magnetic storage) according to particular needs, desires, or particular implementations of the computer 202 and the described functionality. Although illustrated as a single memory 207 in FIG. 2, two or more memories 207 or similar or differing types can be used according to particular needs, desires, or particular implementations of the computer 202 and the described functionality. While memory 207 is illustrated as an integral component of the computer 202, in alternative implementations, memory 207 can be external to the computer 202.

The application 208 is an algorithmic software engine providing functionality according to particular needs, desires, or particular implementations of the computer 202, particularly with respect to functionality described in the present disclosure. For example, application 208 can serve as one or more components, modules, or applications. Further, although illustrated as a single application 208, the application 208 can be implemented as multiple applications 208 on the computer 202. In addition, although illustrated as integral to the computer 202, in alternative implementations, the application 208 can be external to the computer 202.

The computer 202 can also include a power supply 214. The power supply 214 can include a rechargeable or non-rechargeable battery that can be configured to be either user- or non-user-replaceable. In some implementations, the power supply 214 can include power-conversion or management circuits (including recharging, standby, or another power management functionality). In some implementations, the power-supply 214 can include a power plug to allow the computer 202 to be plugged into a wall socket or another power source to, for example, power the computer 202 or recharge a rechargeable battery.

There can be any number of computers 202 associated with, or external to, a computer system containing computer 202, each computer 202 communicating over network 230. Further, the term "client," "user," or other appropriate terminology can be used interchangeably, as appropriate, without departing from the scope of the present disclosure. Moreover, the present disclosure contemplates that many users can use one computer 202, or that one user can use multiple computers 202.

Described implementations of the subject matter can include one or more features, alone or in combination.

For example, in a first implementation, a computer-implemented method, comprising: presenting one or more virtual elements on a VR scenario of a VR application for initiating a service; identifying, using one or more sensors communicably coupled to the VR device, one or more interactive operations of a user of the VR device with the one or more virtual elements; determining whether the one or more interactive operations match one or more predetermined operations for selecting the one or more virtual elements to initiate the service and trigger biometric authentication for user identity authentication; invoking biometric authentication if the one or more interactive operations match one or more predetermined operations; presenting a virtual guidance in the VR scenario for guiding the user to perform the biometric authentication; and presenting a service interface to the user if the biometric authentication is successful.

The foregoing and other described implementations can each, optionally, include one or more of the following features:

A first feature, combinable with any of the following features, wherein the one or more predetermined operations include a predetermined 3D gesture, a head movement, or head posture of the user.

A second feature, combinable with any of the previous or following features, further comprising: performing a bioassay process for detecting the user; and presenting a notification in the VR scenario to notify the user to perform biometric authentication if the user is detected based on the bioassay process.

A third feature, combinable with any of the previous or following features, wherein the bioassay process includes eye-blinking recognition or heartbeat recognition.

A fourth feature, combinable with any of the previous or following features, wherein the biometric authentication is a fingerprint authentication and wherein the virtual guidance is a virtual mark indicating a mounting location of a fingerprint sensor for fingerprint authentication of the user's identity.

A fifth feature, combinable with any of the previous or following features, further comprising: collecting biometric information of the user using one or more biometric sensors for registering the biometric information to the user's user account of the VR device; and sending a biometric registration request to a service server that provides the service, wherein the biometric registration request includes the collected biometric information associated with the user account.

A sixth feature, combinable with any of the previous or following features, further comprising: collecting one or more biometric characteristics of the user using one or more biometric sensors for biometric authentication; and sending a biometric authentication request to the service server, wherein the biometric authentication request includes the one or more biometric characteristics for the service server to compare with the biometric information for biometric authentication.

In a second implementation, a non-transitory, computer-readable medium storing one or more instructions executable by a computer system to perform operations comprising: presenting one or more virtual elements on a VR scenario of a VR application for initiating a service; identifying, using one or more sensors communicably coupled to the VR device, one or more interactive operations of a user of the VR device with the one or more virtual elements; determining whether the one or more interactive operations match one or more predetermined operations for selecting the one or more virtual elements to initiate the service and trigger biometric authentication for user identity authentication; invoking biometric authentication if the one or more interactive operations match one or more predetermined operations; presenting a virtual guidance in the VR scenario for guiding the user to perform the biometric authentication; and presenting a service interface to the user if the biometric authentication is successful.

The foregoing and other described implementations can each, optionally, include one or more of the following features:

A first feature, combinable with any of the following features, wherein the one or more predetermined operations include a predetermined three-dimensional 3D gesture, a head movement, or head posture of the user.

A second feature, combinable with any of the previous or following features, further comprising: performing a bioassay process for detecting the user; and presenting a notification in the VR scenario to notify the user to perform biometric authentication if the user is detected based on the bioassay process.

A third feature, combinable with any of the previous or following features, wherein the bioassay process includes eye-blinking recognition or heartbeat recognition.

A fourth feature, combinable with any of the previous or following features, wherein the biometric authentication is a fingerprint authentication and wherein the virtual guidance is a virtual mark indicating a mounting location of a fingerprint sensor for fingerprint authentication of the user's identity.

A fifth feature, combinable with any of the previous or following features, further comprising: collecting biometric information of the user using one or more biometric sensors for registering the biometric information to the user's user account of the VR device; and sending a biometric registration request to a service server that provides the service, wherein the biometric registration request includes the collected biometric information associated with the user account.

A sixth feature, combinable with any of the previous or following features, further comprising: collecting one or more biometric characteristics of the user using one or more biometric sensors for biometric authentication; and sending a biometric authentication request to the service server, wherein the biometric authentication request includes the one or more biometric characteristics for the service server to compare with the biometric information for biometric authentication.

In a third implementation, a computer-implemented system comprising: presenting one or more virtual elements on a virtual reality VR scenario of a VR application for initiating a service; identifying, using one or more sensors communicably coupled to the VR device, one or more interactive operations of a user of the VR device with the one or more virtual elements; determining whether the one or more interactive operations match one or more predetermined operations for selecting the one or more virtual elements to initiate the service and trigger biometric authentication for user identity authentication; invoking biometric authentication if the one or more interactive operations match one or more predetermined operations; presenting a virtual guidance in the VR scenario for guiding the user to perform the biometric authentication; and presenting a service interface to the user if the biometric authentication is successful.

The foregoing and other described implementations can each, optionally, include one or more of the following features:

A first feature, combinable with any of the following features, wherein the one or more predetermined operations include a predetermined 3D gesture, a head movement, or head posture of the user.

A second feature, combinable with any of the previous or following features, further comprising: performing a bioassay process for detecting the user; and presenting a notification in the VR scenario to notify the user to perform biometric authentication if the user is detected based on the bioassay process.

A third feature, combinable with any of the previous or following features, wherein the bioassay process includes eye-blinking recognition or heartbeat recognition.

A fourth feature, combinable with any of the previous or following features, wherein the biometric authentication is a fingerprint authentication and wherein the virtual guidance is a virtual mark indicating a mounting location of a fingerprint sensor for fingerprint authentication of the user's identity.

A fifth feature, combinable with any of the previous or following features, further comprising: collecting biometric information of the user using one or more biometric sensors for registering the biometric information to the user's user account of the VR device; and sending a biometric registration request to a service server that provides the service, wherein the biometric registration request includes the collected biometric information associated with the user account.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/– R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   presenting one or more virtual elements on a virtual reality (VR) scenario of a VR application for initiating a service;
   identifying, using one or more sensors communicably coupled to a VR device, one or more interactive operations of a user of the VR device with the one or more virtual elements;
   determining whether the one or more interactive operations match one or more predetermined operations for selecting the one or more virtual elements to initiate the service and trigger biometric authentication for user identity authentication;
   upon determining a match of the one or more interactive operations and the one or more predetermined operations, performing a bioassay process for detecting if the user is a real person; and
   upon detecting that the user is a real person, presenting a notification in the VR scenario to notify the user to invoke the biometric authentication for the user identity authentication;
   upon notifying the user to invoke the biometric authentication, invoking the biometric authentication;
   upon invoking the biometric authentication, presenting a virtual guidance in the VR scenario for guiding the user to perform the biometric authentication; and
   upon authenticating the identity of the user by the biometric authentication, presenting a service interface to the user.

2. The computer-implemented method of claim 1, wherein the one or more predetermined operations include a predetermined three-dimensional (3D) gesture, a head movement, or head posture of the user.

3. The computer-implemented method of claim 1, wherein the bioassay process includes eye-blinking recognition or heartbeat recognition.

4. The computer-implemented method of claim 1, wherein the biometric authentication is a fingerprint authentication and wherein the virtual guidance is a virtual mark indicating a mounting location of a fingerprint sensor for fingerprint authentication of the user's identity.

5. The computer-implemented method of claim 4, further comprising:
   sensing movement of the user's finger using one or more biometric sensors; and
   adjusting a pointing direction of the virtual mark based upon the sensed movement of the user's finger.

6. The computer-implemented method of claim 1, further comprising:
   collecting biometric information of the user using one or more biometric sensors for registering the biometric information to the user's user account of the VR device; and
   sending a biometric registration request to a service server that provides the service, wherein the biometric registration request includes the collected biometric information associated with the user account.

7. The computer-implemented method of claim 6, further comprising:
   collecting one or more biometric characteristics of the user using one or more biometric sensors for biometric authentication; and
   sending a biometric authentication request to the service server, wherein the biometric authentication request includes the one or more biometric characteristics for the service server to compare with the biometric information for biometric authentication.

8. A non-transitory, computer-readable medium storing one or more instructions executable by a computer system to perform operations comprising:
   presenting one or more virtual elements on a virtual reality (VR) scenario of a VR application for initiating a service;
   identifying, using one or more sensors communicably coupled to a VR device, one or more interactive operations of a user of the VR device with the one or more virtual elements;
   determining whether the one or more interactive operations match one or more predetermined operations for selecting the one or more virtual elements to initiate the service and trigger biometric authentication for user identity authentication;
   upon determining a match of the one or more interactive operations and the one or more predetermined operations, performing a bioassay process for detecting if the user is a real person; and
   upon detecting that the user is a real person, presenting a notification in the VR scenario to notify the user to invoke the biometric authentication for the user identity authentication;
   upon notifying the user to invoke the biometric authentication, invoking the biometric authentication;
   upon invoking the biometric authentication, presenting a virtual guidance in the VR scenario for guiding the user to perform the biometric authentication; and
upon authenticating the identity of the user by the biometric authentication, presenting a service interface to the user.

9. The non-transitory, computer-readable medium of claim 8, wherein the one or more predetermined operations include a predetermined three-dimensional (3D) gesture, a head movement, or head posture of the user.

10. The non-transitory, computer-readable medium of claim 8, wherein the bioassay process includes eye-blinking recognition or heartbeat recognition.

11. The non-transitory, computer-readable medium of claim 8, wherein the biometric authentication is a fingerprint authentication and wherein the virtual guidance is a virtual mark indicating a mounting location of a fingerprint sensor for fingerprint authentication of the user's identity.

12. The non-transitory, computer-readable medium of claim 11, further comprising:
   sensing movement of the user's finger using one or more biometric sensors; and
   adjusting a pointing direction of the virtual mark based upon the sensed movement of the user's finger.

13. The non-transitory, computer-readable medium of claim 8, further comprising:
   collecting biometric information of the user using one or more biometric sensors for registering the biometric information to the user's user account of the VR device; and
   sending a biometric registration request to a service server that provides the service, wherein the biometric registration request includes the collected biometric information associated with the user account.

14. The non-transitory, computer-readable medium of claim 13, further comprising:
   collecting one or more biometric characteristics of the user using one or more biometric sensors for biometric authentication; and
   sending a biometric authentication request to the service server, wherein the biometric authentication request includes the one or more biometric characteristics for the service server to compare with the biometric information for biometric authentication.

15. A computer-implemented system, comprising:
   one or more computers; and
   one or more computer memory devices interoperably coupled with the one or more computers and having tangible, non-transitory, machine-readable media storing instructions, that when executed by the one or more computers, perform operations comprising:
      presenting one or more virtual elements on a virtual reality (VR) scenario of a VR application for initiating a service;
      identifying, using one or more sensors communicably coupled to a VR device, one or more interactive operations of a user of the VR device with the one or more virtual elements;
      determining whether the one or more interactive operations match one or more predetermined operations for selecting the one or more virtual elements to initiate the service and trigger biometric authentication for user identity authentication;
      upon determining a match of the one or more interactive operations and the one or more predetermined operations, performing a bioassay process for detecting if the user is a real person; and
      upon detecting that the user is a real person, presenting a notification in the VR scenario to notify the user to invoke the biometric authentication for the user identity authentication;
      upon notifying the user to invoke the biometric authentication, invoking the biometric authentication;
      upon invoking the biometric authentication, presenting a virtual guidance in the VR scenario for guiding the user to perform the biometric authentication; and
      upon authenticating the identity of the user by the biometric authentication, presenting a service interface to the user.

16. The computer-implemented system of claim 15, wherein the one or more predetermined operations include a predetermined three-dimensional (3D) gesture, a head movement, or head posture of the user.

17. The computer-implemented system of claim 15, wherein the bioassay process includes eye-blinking recognition or heartbeat recognition.

18. The computer-implemented system of claim 15, wherein the biometric authentication is a fingerprint authentication and wherein the virtual guidance is a virtual mark indicating a mounting location of a fingerprint sensor for fingerprint authentication of the user's identity.

19. The computer-implemented system of claim 15, further comprising:
   collecting biometric information of the user using one or more biometric sensors for registering the biometric information to the user's user account of the VR device; and
   sending a biometric registration request to a service server that provides the service, wherein the biometric registration request includes the collected biometric information associated with the user account.

20. The computer-implemented system of claim 18, further comprising:
   sensing movement of the user's finger using one or more biometric sensors; and
   adjusting a pointing direction of the virtual mark based upon the sensed movement of the user's finger.

* * * * *